(12) United States Patent
Noda et al.

(10) Patent No.: US 6,254,656 B1
(45) Date of Patent: Jul. 3, 2001

(54) SILICA BASED FERTILIZER AND METHOD FOR USING THE SAME

(75) Inventors: Takanobu Noda; Hirofumi Honda, both of Kasugai (JP)

(73) Assignee: Fuji Silysia Chemical Ltd., Kasugai (JP)

( * ) Notice: Subject to any disclaimer, the term of this patent is extended or adjusted under 35 U.S.C. 154(b) by 0 days.

(21) Appl. No.: 09/286,782

(22) Filed: Apr. 6, 1999

(51) Int. Cl.$^7$ ..................................................... C05D 9/00
(52) U.S. Cl. .............................. 71/62; 71/1; 71/31
(58) Field of Search ............................ 71/1, 31, 62

(56) References Cited

U.S. PATENT DOCUMENTS

| | | | |
|---|---|---|---|
| 3,137,564 | * | 6/1964 | Marx ......................................... 71/62 |
| 3,418,238 | * | 12/1968 | Wilson ...................................... 252/1 |
| 5,183,477 | * | 2/1993 | Masuda ..................................... 47/58 |

FOREIGN PATENT DOCUMENTS

2512415 * 9/1976 (DE) .

OTHER PUBLICATIONS

Takahashi, Eiichi, "Effects of Silica on Plants" pp. 299–305.

Takahashi, Eiichi, "Effects of Nutritional Status on Silicic Acid Absorption of Rice Plants", pp. 395–401.

* cited by examiner

Primary Examiner—Steven P. Griffin
Assistant Examiner—Eileen E. Nave
(74) Attorney, Agent, or Firm—Davis & Bujold, P.L.L.C.

(57) ABSTRACT

A fertilizer especially suitable for gramineous plants which has a high supplying ability and a high absorption/availability efficiency of silicic acid and a method for using the same. Silica gel was applied to a test field of paddy rice by 50 g/m$^2$. The silicic acid content in stalks and leaves of paddy rice became extremely high compared with a case where a conventional silicic acid fertilizer was applied. As the result, the stalks became strong by being silicificated and therefore were prevented from being borne down even when ears became heavy with rice, and the harvest yield of rice increased.

6 Claims, 1 Drawing Sheet

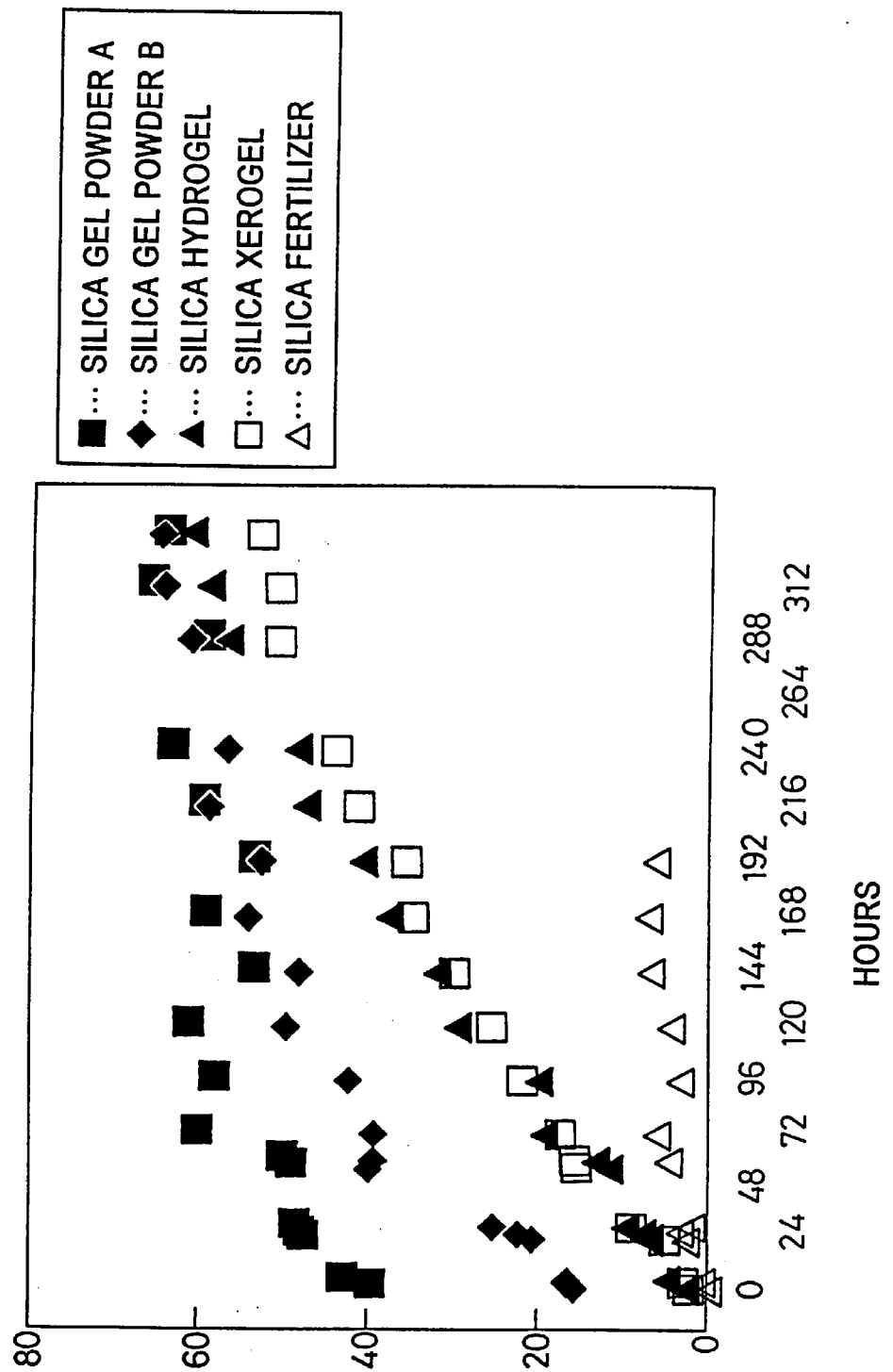

SILICA BASED FERTILIZER AND METHOD FOR USING THE SAME

TECHNICAL FIELD OF THE INVENTION

The invention relates to a fertilizer especially suitable for gramineous plants such as rice and wheat, and a method for improving the growth of the same.

BACKGROUND OF THE INVENTION

Heretofore, fertilizers for growing rice, for example, lime fertilizers, magnesia fertilizers, silicate fertilizers, nitrolime, phosphate fertilizers, potassium salts, calcium perphosphate, compound fertilizers (N, $P_2O_5$), ammonium sulfate, ammonium phosphate, urea, ammonium urate and the like were used.

It is also known that rice and wheat absorb high amounts of silicate. The ash of rice straw contains ca.80% $SiO_2$ and the ash of wheat straw contains ca.70% $SiO_2$. When these gramineous plants lack silicates, silificication of epidermal cells does not occur. As a result, stalks become weak and easily fall down. Moreover, the plants become vulnerable to disease such as blast.

It was 1955 when silicate became known as a fertilizer component. Since then, by-product slag from iron industries or non-iron metal industries came to be used with the name of SICA fertilizer (Keikaru fertilizer). This slag also contains CaO and MgO.

Since many SICA fertilizers consist of alkaline calcium silicate and magnesium silicate, they play a role in neutralizing acidic soils. When such SICA fertilizers are used, the effect of the fertilizer appears slowly, since the decomposition of the alkaline silicate salt is needed for silicic acid ($SiO_2.nH_2O$) to be generated. Also, the influence of calcium residues and the change in the pH values are not negligible after the decomposition.

As aforementioned, nowadays, when silicic acid is to be fed to rice or wheat, the SICA fertilizer is used. But in that case, CaO, MgO and other impurities are strewn at the same time. As a result, problems such as changes in pH values of soil or unforeseeable troubles due to impurities can occur.

SUMMARY OF THE INVENTION

It is an object of the present invention to provide a fertilizer which has an increased ability to furnish silicic acid and provide a high absorption/availability efficiency of the silicic acid to the plants.

Another object of the invention is to provide a method for using the fertilizer.

These and other objects are attained by the invention by providing a fertilizer, especially fitted to gramineous plants, characteristically composed of silica gel or silica sol as a main component. In the invention, "fertilizer" means a material to be added to soils as food nutrients necessary for plant growth.

In the invention, a fertilizer was discovered which is far more effective than conventional silica fertilizers (for example, SICA fertilizer), when silica gels, which were hitherto used mainly as adsorbents, were studied as potential silica fertilizers. Specifically, the supplying efficiency of silicic acid to plants or the absorption/availability efficiency of silicic acid by plants (the ratio of fertilizer actually absorbed by gramineous plants to that spread to the soil) proved to be extremely high. As a result, plant stalks become strong by being silificicated and in the case of rice, for example, the stalks are prevented from being borne down and broken, even when the ears of rice become heavy with full grains. Also, they are prevented from being borne down by the wind or rain.

Moreover, the harvest yield of the grain increases. The reason may be that the photosynthetic efficiency of plants which have absorbed a lot of silicic acid is improved, and their resistance to diseases is strengthened. In addition, in the treated district where the fertilizer of the invention is used, damage to plants by pathogenic fungi or injurious insects is suppressed. Especially, the emergence of blast is effectively suppressed. The blast preventive effect is thought to be the result that it becomes difficult for the hyphae which induce blast to invade the plant bodies because of the silicification of stalks, though its mechanism is not clear.

So-called silica gel is a gel of silicic acid, expressed as $SiO_2.nH_2O$. In general, silica gel by a wet process is composed of a three-dimensional network structure where colloidal particles of non-porous amorphous silica are bound together with siloxane bonds. The total surface areas of all colloidal silica particles consisting of one unit weight is the specific surface, and the total spaces surrounded by the three-dimensional networks of the colloidal silica particle is the pore volume.

When silica gel is prepared, for example, from an aqueous solution of sodium silicate and sulfuric acid, monosilicic acid $Si(OH)_4$ is produced by the hydrolysis of sodium silicate. Further, polysilicate particles with colloidal size, which become a liquidous material or so-called silica sol, are produced by dehydration condensation of monosilicic acid. Thereby, the size of the colloidal particle is influenced by concentrations of both $SiO_2$ and salt, pH and the like. Each colloidal particle of silica sol then coagulates to form a three dimensional network structure, losing fluidity of silica sol and producing a gelatinous solid. The gelatinious solid is called silica hydrogel. The contained sodium silicate and sodium sulfate are washed out with water or the like from the hydrogel. Then, silica hydrogel is obtained which consists of the water of a quantity dependent on the initial stage of silica hydrosol, silicic dioxide and the trace of other impurities. Silica xerogel is obtained by dehydration and drying of the silica hydrogel.

The silica gel which can be used as the main component of the fertilizer of the invention contains all stages of silica gel from silica hydrogel to silica xerogel. As an example of typical silica gel, the silica gel which has a specific surface from 100 to 800 $m^2/g$, a particle size equal to or less than 5 mm and pH of its 5% slurry from 4 to 8 can be shown. In that case, the form of silica gel may be either of powder, crashed particles, sphere particles or the like. Also, silica sol (silica hydrosol) can be used as the main component of the invention.

When a fertilizer of the invention is used, for example, in rice fields, the faster the dissolving speed of silicic acid from the silica sol or silica gel into water, the better the fertilizer. Generally, the speed with which rice plants absorb silicic acid is relatively high. Especially, when ears of rice come out, a substantial amount of silicic acid is absorbed by the plants. Therefore, the higher is the concentration of dissolving silicic acid, that is, the higher is the supplying ability of silicic acid, the better the efficiency of silicic acid absorption by rice, conspicuously accelerating the growth of rice. Specifically, it is preferable for the silica gel or silica sol to have such a property that the silicic acid concentration becomes equal to or higher than 5 ppm, more preferably, equal to or higher than 15 ppm, within 24 hours after the silica gel or silica sol is thrown into water (water which does not contain silicic acid, like ion-exchanged water or distilled water). As the silica gel having the former property, there are silica hydrogel, silica xerogel and silica gel in the state between silica hydrogel and silica xerogel, for example, Fuji Silica Gel Type A and Type B (produced by Fuji Silysia Chemical Ltd.). As the silica gel having the latter property, there is hydrous silica gel (silica gel in a state at which the decrease in the pore volume has already stopped in the process of dehydration of silica hydrogel, that is, silica gel in a state at which a strong three dimensional network structure of colloidal particle has been formed and, in addition, silica gel between a state at which it contains water and a state before it changes to xerogel).

The dissolving rate of silicic acid into water is thought to be highly related with the particle size of silica gel. In order to get a higher dissolving rate, the particle size is preferably equal to or less than 100 $\mu$m.

The preferable quantity of application of the fertilizer of the invention is 1–100 kg/10 a as the weight of silica gel. When the applied quantity is less than the lower limit, a satisfactory effect of the invention may not be attained. Even if the applied quantity exceeds the upper limit, there is no problem since the excessive fertilizer remains in the soil and will be effectively used as the fertilizer in the following season, but the labor for strewing the fertilizer increases.

When the fertilizer of the invention is applied, for example, to rice fields, the yield of rice tends to increase and the emergence probability of disease (blast, for example) tends to decrease, compared with the case where the fertilizer is not applied. Also, the fertilizer may preferably be used with nitrogen fertilizer, phosphate fertilizer or potassium fertilizer, because the harvest increases. Especially when the fertilizer is applied with nitrogen fertilizer, the ear of rice becomes heavy. Therefore, it is preferred to strengthen the stalks by using the fertilizer of the invention.

As the methods for using the fertilizer of the invention, for example, there are the following methods; (1) a method of distributing the fertilizer of the invention in the soil where gramineous plants are cultivated, (2) a method of floating the fertilizer of the invention on the water as fine powder, (3) a method in which the fertilizer of the invention is applied to the nursery bed of gramineous plants, and subsequently the nursery plants are planted in the cultivating soil with the nursery bed, (4) a method of applying the fertilizer of the invention into water for the rice field locally, at one or several positions (for example, throwing the fertilizer into the water near the water intakes of rice field ) and so on.

According to the aforementioned method (1), the fertilizer is preferably strewn uniformly, care being taken not to distribute the fertilizer unevenly. According to the aforementioned methods (2), (3) and (4), since there is no need to take care to spray the fertilizer uniformly, the advantage being that its handling becomes easier. Especially in the case of method (2), when the fertilizer of the invention is mortared to fine powder and floated on the water of rice field, the powder is scattered in a wide range by natural diffusion or wind. Therefore, ease of handling is substantially increased. Within several hours to several days after the powder is dispersed, the silica gel absorbs water and is precipitated. Silicic acid is dissolved out from the powder and absorbed by gramineous plants to accelerate their growth. Also in the case of (4), since the dissolving speed of silicic acid from the fertilizer of the invention is high, silicic acid is easily dissolved into water, diffused throughout the entire rice field and absorbed by gramineous plants, even if the fertilizer is applied locally.

In the case where the gramineous plant is rice, for instance, when dissolved silicic acid in water is absorbed by rice plants and its concentration is decreased, silicic acid is rapidly dissolved out from the fertilizer of the invention. Therefore, sufficient silicic acid is supplied to the rice. For instance, by administering the fertilizer at necessary periods of time corresponding to the growth of rice, silicic acid can be rapidly supplied into plant bodies and an instant effect is attained.

BRIEF EXPLANATION OF DRAWING FIGURE

The FIGURE is a graph showing a test result of dissolving silicic acid.

DETAILED DESCRIPTION OF THE PREFERRED EMBODIMENT

The preferred embodiment of the invention is described as follows. The following Tests 1 and 2 were both carried out in the Hokkaido Central Agricultural Experiment Station in JAPAN.

The fertilizers used in the rice field which are the fertilizers of the invention for gramineous plants, are Fuji Silica Gel type A and Fuji Silica Gel type B (both produced by Fuji Silysia Chemical Ltd.) composed of silicic acid equal to or more than 99.5% by weight. Properties of these are shown in the following Table 1.

TABLE 1

| Commercial name | Bulk density (g/ml) | Pore volume (ml/g) | Surface area (m$^2$/g) | Water content (%) | Average particle size |
|---|---|---|---|---|---|
| Fuji Silica Gel Type A | 0.73 | 0.36 | 650 | $\leq$2 | 5–10 mesh* |
| Fuji Silica Gel Type B | 0.50 | 0.80 | 450 | $\leq$2 | on 40 mesh* |

*mesh: JIS standard sieve

Two kinds of commercial SICA fertilizer used as conventional silicate fertilizers (hereinafter, called Market A and Market B, respectively for convenience sake) were chosen as fertilizers for comparison.

[Test 1] Test in Wooden Frame

A wooden frame test shown in the following Table 2 was carried out to study the supplying ability of silicic acid for the conventional silicic acid fertilizers, Market A and Market B, and Fuji Silica Gel A and Fuji Silica Gel B of the invention.

TABLE 2

| | Outline of Wooden Frame Test |
|---|---|
| Test field | Gley soil |
| Test size | Wooden frame test 7.2 m$^2$ |
| Variety | Kirara 397 25 stocks/m$^2$ |
| Other fertilizers | N-P-K 8-8-8 g/m$^2$ |
| Test samples | Market A [SiO$_2$ 30% (soluble part in 0.5N-HCl(%))] |
| | Market B [SiO$_2$ 20% (the same to the above)] |
| | Fuji Silica Gel Type A (product of Fuji Silysia Chemical Ltd.) |
| | Fuji Silica Gel Type B (product of Fuji Silysia Chemical Ltd.) |
| Applying method | Applied to all layers (during tilling) |

In Experiments 1 and 2, Fuji Silica Gel Type A and Fuji Silica Gel Type B were applied as the test samples and in Comparisons 1 and 2, Market A and Market B were applied. The quantity of application for each sample was determined in such a way that the quantity of available $SiO_2$ becomes 50 g/m² (refer to the following Table. 3). All samples were applied during tilling. In the control, no test sample was used.

TABLE 3

Content of Treatment of Wooden Frame Test

| No. | Test sample | Applied quantity* (g/m²) | Av-$SiO_2$** (g/m²) |
|---|---|---|---|
| Control | — | — | — |
| Experiment 1 | Fuji Silica Gel A | 50 | 50 |
| Experiment 2 | Fuji Silica Gel B | 50 | 50 |
| Comparison 1 | Market A | 166 | 50 |
| Comparison 2 | Market B | 250 | 50 |

*Applied quantity: Applied gross weight
**Av-$SiO_2$: Quantity of available $SiO_2$ The absorption of silicic acid by paddy rice plants was measured successively as time elapsed for the control, Experiments 1 and 2 and Comparisons 1 and 2, respectively. From the result shown in Table 4, the absorption efficiency of silicic acid in either of Experiments 1 and 2 is much higher than that in either of Comparisons 1 and 2 (increase by 9–13%). Moreover, the silicic acid content tended to be higher in Experiments 1 and 2.

TABLE 4

On Silicic Acid Absorption by Paddy Rice

| | $SiO_2$ (%) | | | $SiO_2$ (g/m²) | | Absorption/ availability efficiency of |
|---|---|---|---|---|---|---|
| No. | 8/08 | Straw | Ear | 8/08 | 9/19 | $SiO_2$ (%) |
| Control | 5.5 | 7.9 | 2.8 | 29.8 | 62.9 | — |
| Experiment 1 | 6.4 | 10.3 | 3.2 | 35.6 | 83.4 | 41.0 |
| Experiment 2 | 6.2 | 10.0 | 3.1 | 37.0 | 81.3 | 36.8 |
| Comparison 1 | 6.1 | 9.0 | 3.1 | 35.1 | 76.6 | 27.4 |
| Comparison 2 | 6.1 | 9.4 | 3.1 | 34.5 | 77.1 | 28.4 |

The absorption/availability efficiency of silicic acid was calculated by the following equation:

$$\{(\text{The value of } SiO_2 \text{ on the day of final measuring } (9/19)) - (\text{The value for the control})\} \times 100 / (\text{The quantity of applied } SiO_2 (g/m^2))$$

Crops were also studied for the control, Experiments 1 and 2, and Comparisons 1 and 2. From the result in Table 5, it is clear that the crops tended to increase for Experiments 1 and 2 and Comparisons 1 and 2, where silicic acid fertilizer was applied, compared with the crop for the control, and the crops for Experiments 1 and 2 further increased compared with the crops for Comparisons 1 and 2.

TABLE 5

Crops

| No. | Total weight (g) | Weight of straw (g) | Weight of rough rice (g) | Weight of brown rice (g) | Ratio* |
|---|---|---|---|---|---|
| Control | 1401 | 668 | 733 | 582 | 100 |
| Experiment 1 | 1462 | 667 | 795 | 625 | 107 |
| Experiment 2 | 1476 | 666 | 810 | 644 | 110 |
| Comparison 1 | 1466 | 694 | 772 | 611 | 105 |
| Comparison 2 | 1447 | 669 | 778 | 610 | 105 |

*Ratio = (Weight of rough rice for sample)/(Weight of rough rice for control)

Subsequently, the content of available silicic acid in the soil after rice was cropped was studied. The result shown in Table 6 clearly shows that the content of silicic acid for Markets A and B did not substantially differ from that for the control, meaning that silicic acid is not effectively supplied to the plant. To the contrary, the content of available silicic acid in the gley soil for Fuji Silica Gels A and B increased by 1.27–1.43 times compared with that for the control, showing that the suppliability of silicic scid for Fuji Silica Gels A and B is very high.

TABLE 6

Change of available silicic acid in soil

| Test sample | Applied quantity (g/m²) | Av-$SiO_2$ (mg/100 g)* | |
|---|---|---|---|
| | | Gley soil | Peat soil |
| Control | — | 6.3 | 5.3 |
| Market A | 166 | 6.3 | 7.1 |
| Market B | 250 | 6.7 | 6.9 |
| Fuji Silica Gel A | 50 | 8.0 | 16.2 |
| Fuji Silica Gel B | 50 | 9.0 | 12.7 |

*Av-$SiO_2$: Available silicic acid in soil, the same as that of Table 1.

In the case of peat soil for Fuji Silica Gel A or B, the applied quantity was 200 g/m².

As shown by the aforementioned wooden frame test, the supplying ability of silicic acid was extremely high and the content of silicic acid in stalks and leaves of rice plant also became very high for Experiments 1 and 2 compared with those for Comparisons 1 and 2. As the result, the stalks of rice become strong by the silicification. Therefore, even when ears of rice become heavy with full grain, stalks are prevented from being broken or falling down. Also, they are effectively prevented from being borne down by wind and rain.

In addition, the harvest for Experiments 1 and 2 increased by 7–10% compared with the control and by 2–5% compared with Comparisons 1 and 2, respectively. That is, the growth of rice was remarkably promoted by the fertilizer of the present invention.

Moreover, though the conventional silicic acid fertilizer, SICA fertilizer for example, contains unnecessary components or impurities like calcium which is not substantially needed, Fuji Silica Gel A and Fuji Silica Gel B have both the purity equal to or more than 99.5%. Therefore, increase of application quantity due to unnecessary components or impurities is avoided, making fertilizer distribution operations easier, without fear that unnecessary components or impurities will influence the harvest.

[Test 2] Field Test

In order to study the effect as a silicic acid supply source concerned with Fuji Silica Gel A which is a fertilizer of the invention for gramineous plants, a test shown in Table 7 was carried out.

TABLE 7

Outline of field test

| | |
|---|---|
| Test field | Gley soil, Peat soil |
| Test scale | 25–50 m²/section |
| Variety | Kirara 397 25 stocks/m² |
| Other fertilizers | N-P-K 8-8-8 g/m² |
| Test sample | Fuji Silica Gel A (product of Fuji Silysia Chemical Ltd.) |
| Application method | Application to all layers (during tilling) |

The content of test treatment is shown in Table 8.

Experiment n corresponds to Comparison n (n is from 3 to 8). Except for the application of silica gel, all conditions were made equal in both of each corresponding Experiment and Comparison. In Experiments 3–5 and Comparisons 3–5, gley soil was used (to which 200 kg of fertilizer had been applied per 10 a in previous year) as the soil, and in Experiments 6–8 and Comparisons 6–8, peat soil was used as the soil. The application quantity of nitrogen fertilizer was fixed at three levels of 0, 4 and 8(kg/10 a) and that of potassium phosphate was fixed at 8 (kg/10 a) in all treatment sections. Silica gel was applied to all layers during tilling.

TABLE 8

Content of test treatment

| No. | Soil | Silica gel* (kg/10a) | Nitrogen (kg/10a) | Potassium phosphate |
|---|---|---|---|---|
| Experiment 3 | Gley | 100 | 0 | 8 (kg/10a) for all sections |
| Comparison 3 | Gley | 0 | 0 | |
| Experiment 4 | Gley | 100 | 4 | |
| Comparison 4 | Gley | 0 | 4 | |
| Experiment 5 | Gley | 100 | 8 | |
| Comparison 5 | Gley | 0 | 8 | |
| Experiment 6 | Peat | 100 | 0 | 8 (kg/10a) for all sections |
| Comparison 6 | Peat | 0 | 0 | |
| Experiment 7 | Peat | 100 | 4 | |
| Comparison 7 | Peat | 0 | 4 | |
| Experiment 8 | Peat | 100 | 8 | |
| Comparison 8 | Peat | 0 | 8 | |

*Silica gel: Fuji Silica Gel Type A (Product of Fuji Silysia Chemical Ltd.)

The supply of silicic acid and the absorption of the same by paddy rice was measured successively as time elapsed for Experiments 3–8 and Comparisons 3–8. The result is shown in Table 9. Numbers in the column of soil solution in Table 9 are measured values of Si concentration in the filtered water from rice field.

As clearly shown in Table 9, the silicic acid concentration and the absorption/availability efficiency of silicic acid by rice plants for every Experiment from 3 to 8 were higher than those for corresponding Comparison from 3 to 8. Also, the content of silicic acid in stalks and leaves of paddy rice tended to be higher for each Experiment than that for corresponding Comparison.

TABLE 9

Supply of silicic acid by silica gel and its absorption by paddy rice

| | Soil solution (Si:ppm) | | | SiO2 in stalks and leaves (%) | | | Quantity of SiO₂(kg/10a) | | | A/A |
|---|---|---|---|---|---|---|---|---|---|---|
| No. | 6/01 | 6/22 | 7/12 | 7/12 | 8/07 | 9/25 | 7/12 | 8/07 | 9/25 | E* |
| Exp. 3 | 10.7 | 9.7 | 8.8 | 5.9 | 9.0 | 12.7 | 4.0 | 39.2 | 71.3 | |
| Com. 3 | 6.7 | 5.0 | 4.0 | 3.8 | 6.2 | 9.2 | 2.5 | 26.8 | 50.9 | |
| Exp. 4 | 13.0 | 11.5 | 10.3 | 5.2 | 9.5 | 12.5 | 5.5 | 53.8 | 82.6 | |
| Com. 4 | 6.6 | 4.9 | 3.5 | 2.9 | 4.7 | 6.5 | 3.1 | 25.1 | 47.0 | |
| Exp. 5 | 12.6 | 11.0 | 10.9 | 4.8 | 8.6 | 11.0 | 5.6 | 57.2 | 94.3 | |
| Com. 5 | 6.5 | 4.8 | 3.8 | 2.7 | 4.1 | 6.1 | 3.2 | 25.0 | 49.9 | |
| Exp. 6 | 10.7 | 12.2 | 10.2 | 6.5 | 7.7 | 13.1 | 3.5 | 28.4 | 74.8 | 16.4 |
| Com. 6 | 7.5 | 5.8 | 4.5 | 3.5 | 5.4 | 7.3 | 1.9 | 18.9 | 42.0 | |
| Exp. 7 | 11.6 | 10.3 | 11.3 | 5.9 | 7.2 | 13.0 | 4.5 | 35.7 | 87.1 | 21.8 |
| Com. 7 | 7.4 | 5.4 | 4.2 | 3.1 | 5.2 | 6.4 | 2.6 | 24.5 | 43.6 | |
| Exp. 8 | 11.4 | 14.8 | 14.3 | 6.1 | 7.0 | 12.7 | 6.0 | 40.4 | 88.5 | 20.2 |
| Com. 8 | 6.9 | 5.6 | 4.4 | 3.3 | 4.6 | 6.2 | 3.1 | 25.4 | 48.2 | |

Exp. = Experiment and Com. = Comparison
*A/A E = Absorption/Availability Efficiency of Silicic Acid Harvests were also measured for Experiments 3–8 and for Comparisons 3–8. As clearly shown by the result in Table 10, the harvest for each Experiment was inclined to increase in general, compared with that for corresponding Comparison.

TABLE 10

Harvest

| No. | Total weight (kg/10a) | Weight of straw (kg/10a) | Weight of rough rice (kg/10a) | Weight of brown rice (kg/10a) | Ratio* |
|---|---|---|---|---|---|
| Exp. 3 | 969 | 460 | 499 | 401 | 100 |
| Com. 3 | 956 | 451 | 495 | 396 | 101 |
| Exp. 4 | 1206 | 530 | 676 | 531 | 98 |
| Com. 4 | 1204 | 530 | 674 | 540 | 100 |
| Exp. 5 | 1504 | 685 | 819 | 631 | 107 |
| Com. 5 | 1356 | 607 | 749 | 592 | 100 |
| Exp. 6 | 1031 | 455 | 576 | 460 | 107 |
| Com. 6 | 979 | 448 | 531 | 431 | 100 |
| Exp. 7 | 1210 | 526 | 684 | 543 | 108 |
| Com. 7 | 1179 | 553 | 626 | 501 | 100 |
| Exp. 8 | 1359 | 584 | 775 | 605 | 106 |
| Com. 8 | 1331 | 611 | 720 | 570 | 100 |

*Ratio = (Weight of brown rice for Experiment)/(Weight of brown rice for corresponding Comparison)

It was confirmed from the aforementioned field test that Fuji Silica Gel Type A which is a fertilizer of the invention for the rice field is an excellent supply source of silicic acid for paddy rice which includes an efficiency of availability. In addition, there is an inclination that the crop increased in the treatment section where Fuji Silica Gel A was applied. Besides, not only was the growth of rice promoted but also the probability of emergence of the blast tended to be lowered.

[Test 3] Test for Dissolving Silicic Acid

In order to investigate the dissolving speed of silicic acid from silica gel, a test for dissolving silicic acid was carried out.

As test samples, silica gel powder A, silica gel powder B, silica hydrogel, whose production method was described in the column of "summary of the invention" in the specification of the invention, silica xerogel(the same to aforementioned Fuji Silica Gel Type A) and SICA fertilizer (commercial product) were used. Properties of each sample are shown in Table 11. The silica gel powder A is fine powder of silica gel B which is hydrous silica gel.

For the preparation of hydrous silica gel, a known method was used (for example, a method described in Japanese Provisional Publication No. 207712/'87). Specifically, by mixing predetermined quantities of aqueous solution of sodium silicate ($SiO_2$ 20 weight %) and 12N sulfuric acid with a mixer, homogeneous silica sol with 1.0N excess sulfuric concentration was prepared, then it was kept at room temperature for 2 hours to polymerize it sufficiently until gelation and homogeneous and transparent lump-like silica hydrogel was obtained. Further, by washing the silica hydrogel with water, soluble salt was removed and aging were carried out. Subsequently, the silica hydrogel was dried with hot air until a required water content was attained and ground into powder having a required particle size.

TABLE 11

| Test sample | $SiO_2$ content (%) | Specific Surface area ($m^2/g$) | Average particle size ($\mu m$) | Water Content (wt %) |
|---|---|---|---|---|
| Silica gel Powder A | 88–93 | 700 | 2–3 | 7–12 |
| Silica gel Powder B | 88–93 | 700 | 6–18 | 7–12 |
| Silica hydrogel | 66.0 | 650 | (5–10 mesh*) | 34 |
| Silica xerogel | >98 | 650 | (5–10 mesh*) | — |
| SICA fertilizer | 32.0 | — | — | — |

*mesh: JIS standard sieve

Silicic acid content was measured by the following method. Each test sample (10 g as silica) was put into 1 liter of distilled water with pH 6.5, stood still after sufficient agitation, sampled at intervals of predetermined time and the quantitative analysis of silica was carried out for the samples. The optical absorbancy of heteropoly compound (yellow) which was produced by the reaction of ionic silica with ammonium paramolybdate was measured with Ubet-50 type spectrphotometer (made by Nippon Bunkou Inc.) and the content of silicic acid was thus determined.

The test result of dissolving silicic acid carried out in such a way is shown in FIG. 1.

As clearly shown in FIG. 1, the order of dissolving rate of silicic acid was as follows; silica gel powder A>silica gel powder B>silica xerogel, silica hydrogel>SICA fertilizer. The concentrations of silicic acid 3 hours and 24 hours after the samples were put into water are listed in Table 12.

TABLE 12

Silicic acid concentrations after 3 hours and 24 hours

| | $SiO_2$ concentration (ppm) | |
|---|---|---|
| Test sample | after 3 hours | after 24 hours |
| Silica gel powder A | 40 | 47.5 |
| Silica gel powder B | 16 | 20.6 |
| Silica hydrogel | 3 | 6.4 |
| Silica xerogel | 2 | 5.0 |
| SICA fertilizer | 0.1 | 2.8 |

From the result in Table 6 of Test 1, a correlation is known between the dissolving rate of silicic acid and the absorption/availabilty efficiency of silicic acid by paddy rice. That is, the higher the dissolving rate of silicic acid, or the higher the quantity of silicic acid which is dissolved into water in a unit time, the higher the absorption/availability efficiency of silicic acid by paddy rice is. In aforementioned Test 1, the dissolving rate of silicic acid of Market A and Market B or SICA fertilizers did not give a sufficiently high harvest, while the dissolving rate of Fuji Silica Gel A or silica xerogel gave a high absorption/availability efficiency of silicic acid by paddy rice and a high harvest of rice. From these results, it is seen that the dissolving rate for silica xerogel, at least, gives a sufficient result. Therefore, it is preferred for silica gel that silicic acid concentration becomes 2 ppm or more in 3 hours and 5 ppm or more in 24 hours after it is thrown into water.

As aforementioned, since a higher dissolving rate of silicic acid is more advantageous, the adaptability as fertilizers for rice fields is in the order of: silica gel powder A>silica gel powder B>silica xerogel, silica hydrogel, when handling is not considered.

The invention is not limited to the aforementioned embodiment but can be variously modified within the scope of the invention.

For example, in the field test of aforementioned Test 2, the silica gel (Fuji Silica Gel) was strewn nearly uniformly on rice fields, but a same effect can be obtained even when silica gel is applied to a nursery bed of rice, and the nursery plants are subsequently planted in the bed with the cultivated soil.

Alternatively, the finely pulverized silica gel can be floated in the water of a rice field. In this case, the silica gel itself diffuses and is dispersed over wide range and subsequently absorbs water by itself during sinking, while silicic acid is dissolved from the silica gel and absorbed by gramineous plants, promoting growth of the plant.

Moreover, the silica gel can be supplied in the water for rice fields locally, at one or several positions. In this case, the silica itself is dissolved in water to supply silicic acid which is absorbed by gramineous plants after dispersing to all regions of the rice field thereby promoting growth of the plants.

What is claimed is:

1. A silica based fertilizer consisting essentially of a silica gel having at least 99.5% by weight silicic acid.
2. The silica based fertilizer as set forth in claim 1 wherein the particle size is no greater than 100 $\mu m$.
3. The silica based fertilizer as set forth in claim 1 wherein said silica gel has a specific surface area from 100–800 $m^2/g$, and a pH of a 5% slurry between 4 and 8.
4. The silica based fertilizer as set forth in claim 3 wherein said silica gel has the form of at least one of a powder, crushed particles and sphere particles.

5. The silica based fertilizer as set forth in claim 3 wherein said silica gel substantially comprises a bulk density of 0.73 g/ml, a pore volume of 0.36ml/g, a surface area of 650 m$^2$/g, and a water content of no more than 2%.

6. The silica based fertilizer as set forth in claim 3 wherein said silica gel substantially comprises a bulk density of 0.50 g/ml, a pore volume of 0.80 ml/g, a surface area of 450 m$^2$/g, and a water content of no more than 2%.

* * * * *